(12) United States Patent
Matsunami et al.

(10) Patent No.: US 11,972,391 B2
(45) Date of Patent: Apr. 30, 2024

(54) AUTONOMOUS TRAVELING UNIT, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Tatsuya Matsunami, Nisshin (JP); Atsuko Yamanaka, Toyota (JP); Kunihiro Tsunekawa, Toyota (JP); Sokfan Yee, Toyota (JP); Masahiro Tanaka, Toyota (JP); Shuichiro Takahashi, Okazaki (JP); Satoshi Nonoyama, Toyota (JP); Tokuyuki Nishikawa, Toyota (JP); Hikaru Satou, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 686 days.

(21) Appl. No.: 17/113,868

(22) Filed: Dec. 7, 2020

(65) Prior Publication Data
US 2021/0182776 A1    Jun. 17, 2021

(30) Foreign Application Priority Data
Dec. 13, 2019   (JP) .................. 2019-225191

(51) Int. Cl.
G06Q 30/00     (2023.01)
G06Q 10/087    (2023.01)
G06Q 30/0601   (2023.01)

(52) U.S. Cl.
CPC ....... *G06Q 10/087* (2013.01); *G06Q 30/0601* (2013.01)

(58) Field of Classification Search
CPC .................. G06Q 10/087; G06Q 30/0601
(Continued)

(56) References Cited

U.S. PATENT DOCUMENTS 11,099,562 B1 *  8/2021  Ebrahimi Afrouzi .............. G05D 1/0276
11,259,266 B2 *  2/2022  Chang ............ H04B 17/27
(Continued)

FOREIGN PATENT DOCUMENTS

CN    106203929 A    12/2016
CN    109313711 A     2/2019
(Continued)

OTHER PUBLICATIONS

Yoo, H.D. and Chankov, S.M., Drone-delivery using autonomous mobility: An innovative approach to future last-mile delivery problems, Dec. 2018, In 2018 IEEE international conference on industrial engineering and engineering management, pp. 1216-1220. (Year: 2018).*

*Primary Examiner* — Jeffrey A. Smith
*Assistant Examiner* — Brittany E Bargeon
(74) *Attorney, Agent, or Firm* — Oliff PLC

(57) ABSTRACT

The present disclosure makes it possible to further improve convenience of customers and the like accompanying purchase of merchandise. An autonomous traveling unit is provided with: a driving portion including an autonomous traveling ability, the driving portion being configured to be movable together with a storing portion configured to store merchandise; and a controlling portion configured to execute: acquiring settlement completion information about the merchandise stored in the storing portion, the merchandise being merchandise in a store; and controlling the driving portion to cause the merchandise storing portion to
(Continued)

move to a first point outside the store after acquiring the settlement completion information.

20 Claims, 11 Drawing Sheets

(58) Field of Classification Search
USPC .......................................................... 705/26.1
See application file for complete search history.

(56) References Cited

U.S. PATENT DOCUMENTS

| | | | |
|---|---|---|---|
| 11,590,997 B1* | 2/2023 | Bhaskaran | B62B 5/0069 |
| 2017/0220979 A1* | 8/2017 | Vaananen | G06Q 10/083 |
| 2017/0293991 A1* | 10/2017 | High | G05D 1/0011 |
| 2018/0197218 A1* | 7/2018 | Mallesan | G07G 1/0054 |
| 2019/0227551 A1 | 7/2019 | Igata et al. | |
| 2019/0228457 A1 | 7/2019 | Wu | |
| 2020/0202722 A1* | 6/2020 | Pydin | G08G 1/0112 |

FOREIGN PATENT DOCUMENTS

| | | |
|---|---|---|
| CN | 109409175 A | 3/2019 |
| CN | 110069062 A | 7/2019 |
| JP | 2006-155039 A | 6/2006 |
| JP | 2009-251625 A | 10/2009 |
| JP | 2019-128801 A | 8/2019 |
| JP | 2019-185144 A | 10/2019 |

\* cited by examiner

AUTONOMOUS TRAVELING UNIT, INFORMATION PROCESSING METHOD AND NON-TRANSITORY STORAGE MEDIUM

CROSS REFERENCE TO THE RELATED APPLICATION

This application claims the benefit of Japanese Patent Application No. 2019-225191, filed on Dec. 13, 2019, which is hereby incorporated by reference herein in its entirety.

BACKGROUND

Technical Field

The present disclosure relates to an autonomous traveling unit, an information processing method and a non-transitory storage medium therefor.

Description of the Related Art

Conventionally, systems that make it possible to perform purchase settlement of merchandise without providing a cash register at an entrance of a store have been proposed (see, for example, Patent document 1).

CITATION LIST

Patent Document

Patent document 1: Japanese Patent Laid-Open No. 2009-251625

SUMMARY

One or more aspects of the present disclosure are directed to make it possible to further improve convenience of customers accompanying purchase of merchandise.

One aspect of an embodiment of the present disclosure may be an autonomous traveling unit comprising: a driver including an autonomous traveling ability, the driver being configured to be movable together with a storage configured to store merchandise; and a controller comprising at least one processor configured to execute: acquiring settlement completion information about the merchandise stored in the storage, the merchandise being merchandise in a store; and controlling the driver to cause the storage to move to a first point outside the store after acquiring the settlement completion information. Another aspect of the present disclosure may be illustrated by an information processing method in at least one computer such as an information processing apparatus provided with the controller described above. Furthermore, another aspect of the present disclosure may be illustrated by a non-transitory storage medium on which the program is stored for at least one computer to be caused to execute.

According to the autonomous traveling unit, it becomes possible to further improve convenience of customers accompanying purchase of merchandise.

DESCRIPTION OF THE EMBODIMENTS

An autonomous traveling unit, an information processing method in a controller of the autonomous traveling unit, and a non-transitory storage medium according to embodiments of the present disclosure will be described below with reference to drawings.

Figure 1:
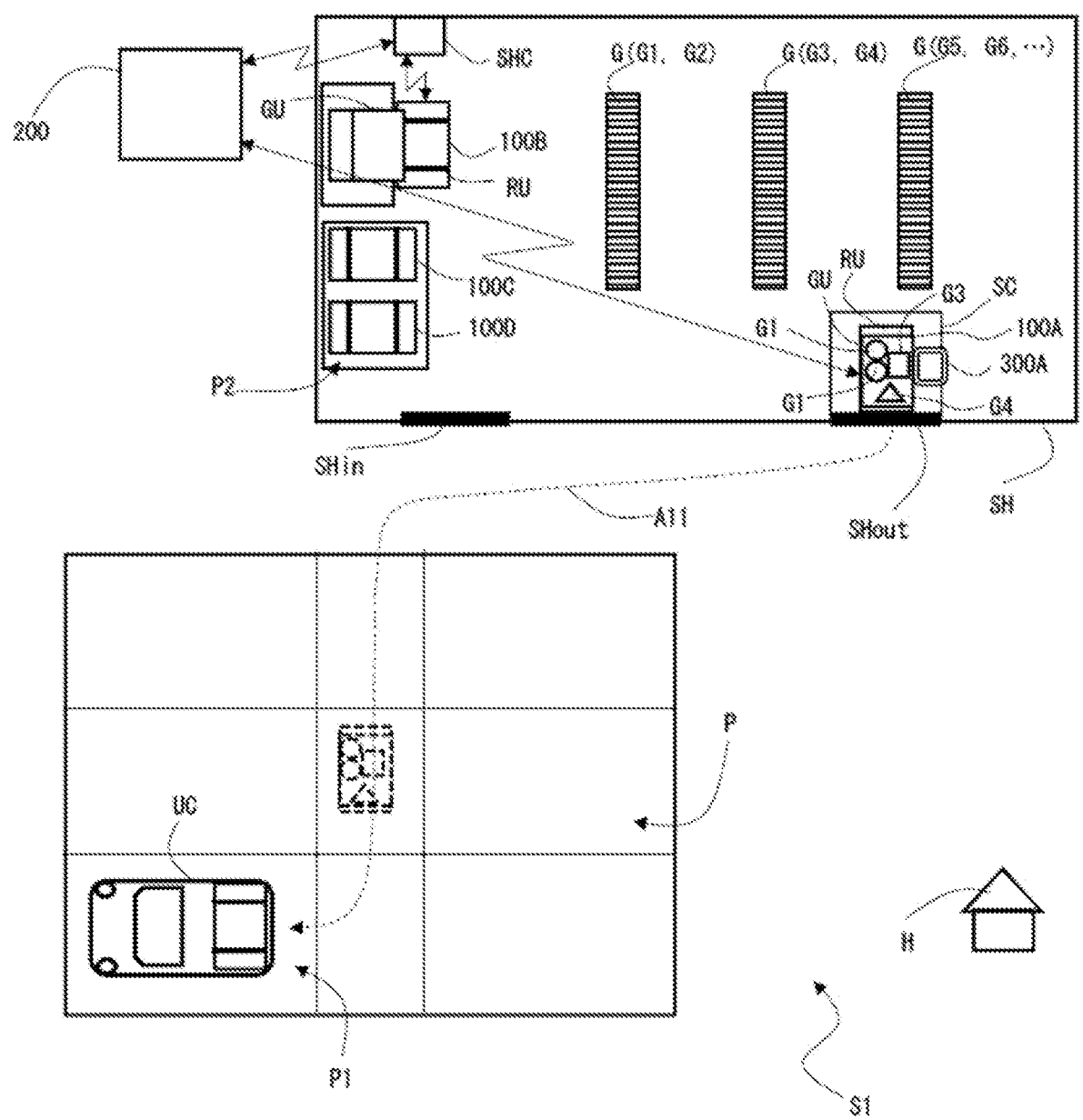
FIG. 1 is a conceptual diagram of a system according to a first embodiment of the present disclosure.
Figure 2:
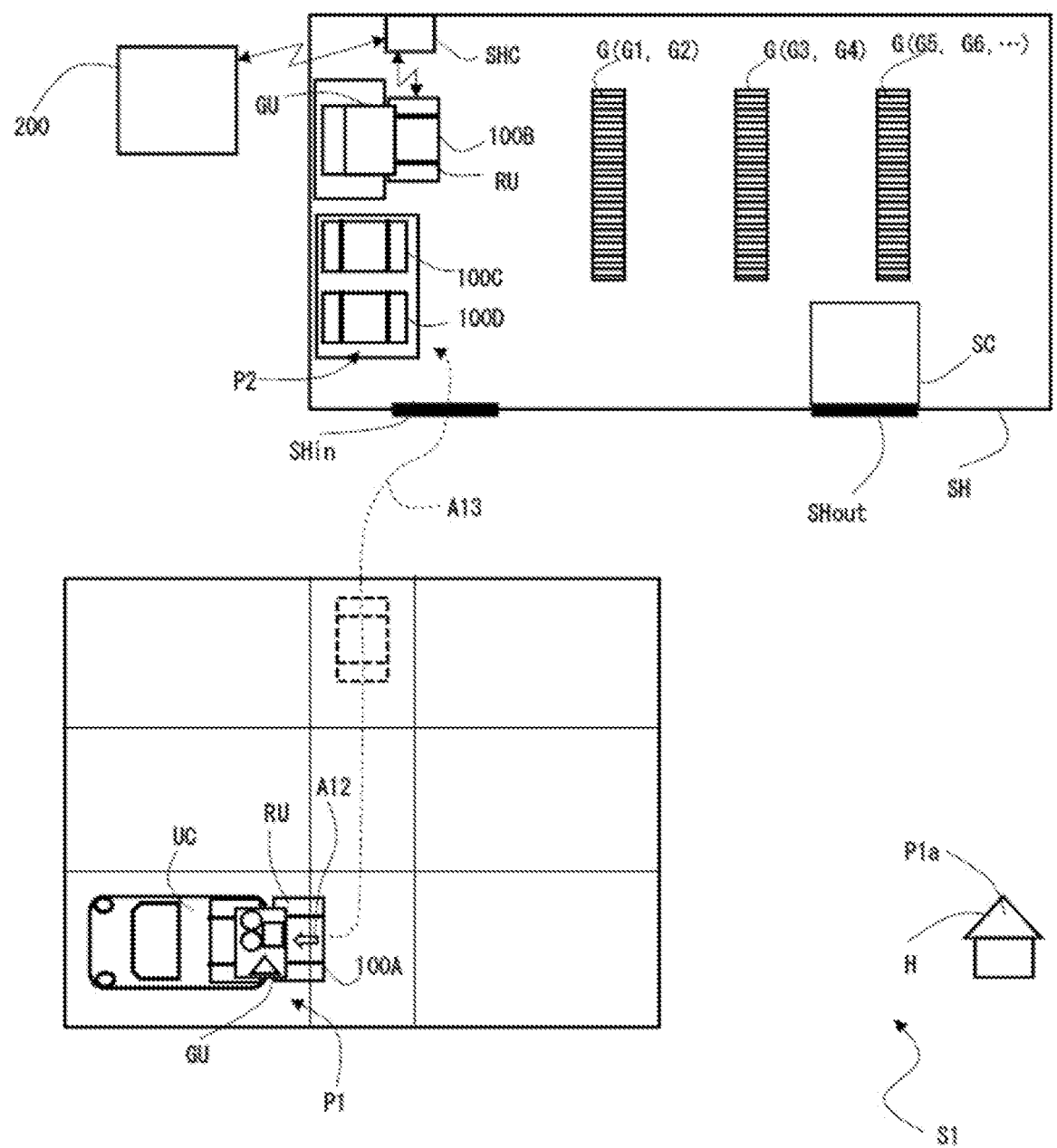
FIG. 2 is a conceptual diagram of the system of FIG. 1 in a situation different from FIG. 1.

FIGS. 1 and 2 schematically illustrate a system S1 according to a first embodiment of the present disclosure. Each of FIGS. 1 and 2 schematically illustrates a situation of a service (hereinafter, a merchandise purchase service) in purchase of merchandise G (G1, G2, G3, . . . ) in a store SH to which the system S1 is applied. FIG. 1 is a diagram for explaining purchase of merchandise in the system S1 and movement of the purchased merchandise to a first position after the purchase. FIG. 2 is a diagram for explaining a flow after the purchased merchandise is moved to the first position in the system S1.

The system S1 is provided with autonomous traveling units 100 (100A, . . . ) and a server apparatus 200. The system S1 further has user apparatuses 300 (300A, . . . ). Note that, though the server apparatus 200 is not an essential component, the system S1 is provided with the server apparatus 200 in the present embodiment.

The autonomous traveling units 100 are moving bodies configured to be capable of executing the merchandise purchase service of the system S1. The server apparatus 200 is an information processing apparatus and is a computer on a network N. The server apparatus 200 is configured to be capable of communicating with each of the autonomous traveling units 100 via the network N and cooperates with information processing apparatuses 102 of the autonomous traveling units 100 via the network N. Note that, in FIG. 1, only traveling units 100A, 100B, 100C and 100D among the plurality of traveling units 100 (100A, . . . ) are illustrated. However, this is not intended to limit the number of traveling units 100, and any number equal to or larger than one is possible.

The server apparatus 200 is also capable of communicating with other server apparatuses and the like via the network N. In addition to being configured to be capable of each of the autonomous traveling units 100, the server apparatus 200 is also configured to be capable of communicating with each of the user apparatuses 300 via the network N.

The user apparatuses 300 are configured to be capable of communicating with the server apparatus 200 via the network N. Further, the user apparatuses 300 are also configured to be capable of communicating with the autonomous traveling units 100 via the network N. In FIG. 1, only a user apparatus 300A among the plurality of user apparatuses 300 (300A, ...) is illustrated. However, this is not intended to limit the number of user apparatuses 300, and any number is possible.

The autonomous traveling units 100 are a kind of autonomous traveling vehicle and are also called electric vehicle (EV) palettes. Especially, the autonomous traveling units 100 are configured to function as so-called shopping carts here. The autonomous traveling units 100 are configured as moving bodies capable of autonomous driving and unmanned driving. Though all the autonomous traveling units 100 have the same size and the same configuration in the system S1, the autonomous traveling units 100 are not limited thereto and may be configured, for example, having various sizes. Note that the autonomous traveling units 100 may be configured such that a person can get on and off or may be configured to be capable of traveling on a road.

Each of the autonomous traveling units 100 has a control function for its own control and a communication function. In addition to processing that the autonomous traveling unit 100 can execute alone, the autonomous traveling unit 100 can provide functions and services added by the server apparatus 200 on the network N to a user in cooperation with the server apparatus 200 on the network N. The autonomous traveling unit 100 is not necessarily required to be capable of complete autonomous travel. For example, the autonomous traveling unit 100 may be a vehicle that a person drives or that assists driving according to situations. Here, the autonomous traveling units 100 performs following a user by autonomous travel, for example, in the store SH in the system S1 as basic control, and the autonomous traveling unit 100 is further configured such that operation by a user is also possible. In the present embodiment, the autonomous traveling unit 100 is configured so that a user or the like can operate it, for example, when external force is applied from the user or the like.

As described above, the autonomous traveling units 100 are also configured to be capable of communicating with the user apparatuses 300 (300A, ...) via the network N. The user apparatuses 300 accept an input or an operation corresponding to an input from a user, and can communicate with not only the server apparatus 200 but also the autonomous traveling units 100 via the network N.

Here, the server apparatus 200 is, for example, an apparatus that instructs an operation to each traveling units 100. For example, the server apparatus 200 transmits an operation instruction that includes a travel plan of the autonomous traveling unit 100 within a predetermined range of the merchandise purchase service, to the autonomous traveling unit 100. Furthermore, the server apparatus 200 is also an apparatus that pertains settlement of merchandise for the autonomous traveling units 100 in the store SH.

Each component in the system S1 of FIGS. 1 and 2 will be described in detail below. First, the autonomous traveling units 100 will be described.

The autonomous traveling units 100 are configured to function as so-called shopping carts as described before. The autonomous traveling units 100 are provided with autonomous traveling portions RU. In the present embodiment, merchandise storing portions GU are separably provided on the autonomous traveling portions RU. As illustrated in FIG. 1, the autonomous traveling units 100, that is, the merchandise storing portions GU that are to be separably combined with the autonomous traveling portions RU exist in the store SH. By causing a merchandise storing portion GU to be placed on an autonomous traveling portions RU so that the merchandise storing portion GU can move together with the autonomous traveling portion RU, a merchandise information acquiring portion 109 described later is into an ON state from an OFF state. When the merchandise storing portion GU is separated from the autonomous traveling portion RU, the merchandise information acquiring portion 109 is into the OFF state. Note that the merchandise storing portion GU is a basket type member configured to be provided for a user together with purchased merchandise, the merchandise storing portion GU is not limited thereto but may be configured, for example, to have a different shape. Further, the merchandise storing portion GU is not limited to the form of being placed on and combined with the autonomous traveling portion RU but may be, for example, a unit that is pulled by the autonomous traveling portion RU. Note that, in the case of the autonomous traveling units 100 in the present embodiment, the merchandise storing portions GU can be separated from the autonomous traveling portions RU, but this is not an essential configuration. The merchandise storing portions GU may be inseparably and integrally provided on the autonomous traveling portions RU.

Figure 3:
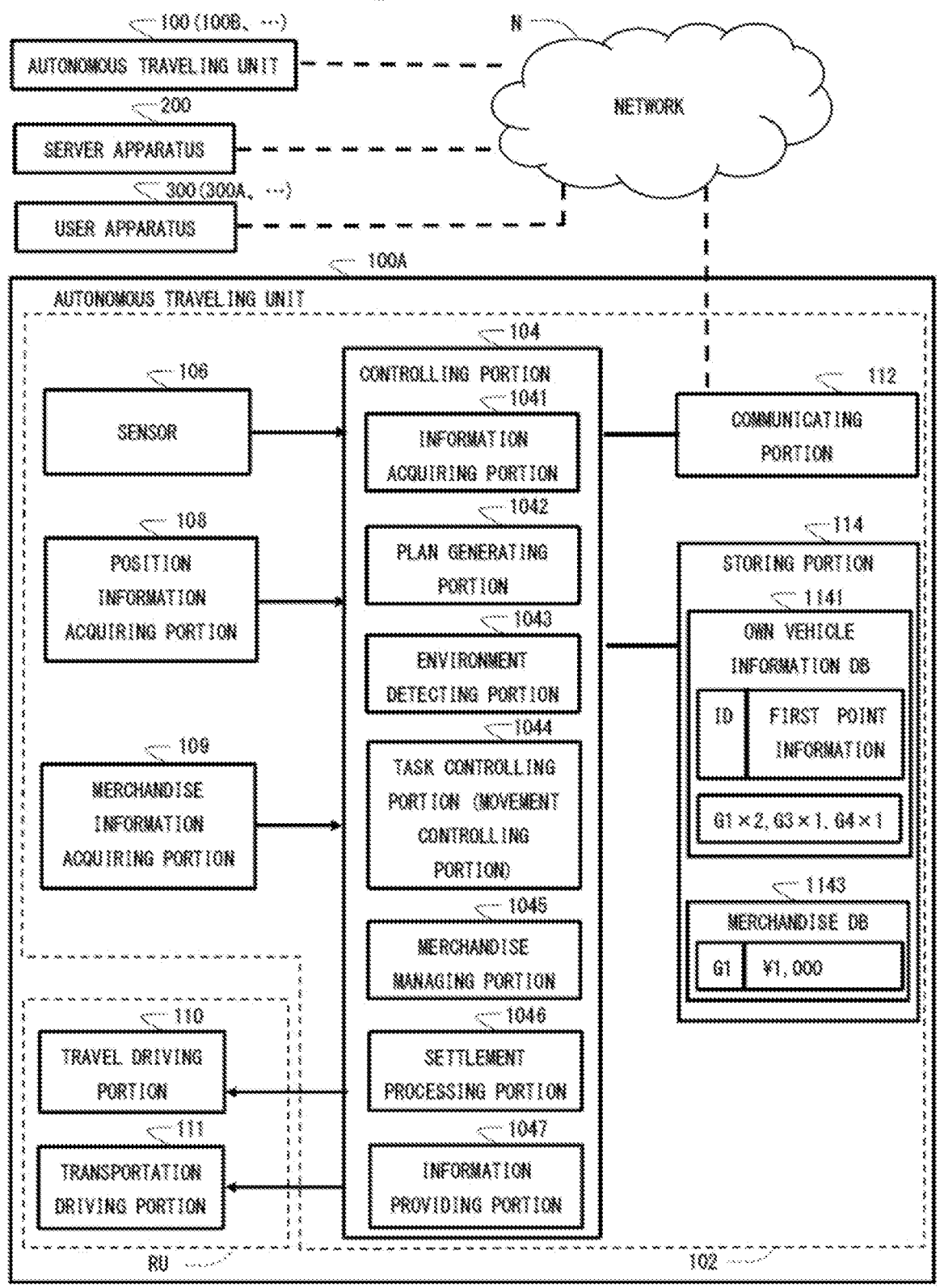
FIG. 3 is a block diagram schematically illustrating a configuration of the system of FIG. 1 and is a diagram illustrating especially a configuration of an autonomous traveling unit.

FIG. 3 is a block diagram schematically illustrating a configuration of the system S1 that includes the autonomous traveling units 100, the server apparatus 200 and the user apparatuses 300 and is a diagram illustrating especially a configuration of the autonomous traveling unit 100A. In FIG. 3, the configuration of the autonomous traveling unit 100A is illustrated as an example of the autonomous traveling units 100. The other autonomous traveling units 100 (100B, 100C, 100D ...) have configurations similar to the configuration of the autonomous traveling unit 100A as already described above.

The autonomous traveling unit 100A of FIG. 3 is provided with the information processing apparatus 102 and has a controlling portion 104 that is substantially responsible for the function of the information processing apparatus 102. The autonomous traveling unit 100A can travel according to an operation instruction acquired from the server apparatus 200. Specifically, the autonomous traveling unit 100A travels in an appropriate method, sensing the surroundings of the vehicle, based on the operation instruction acquired via the network N. Then, at the time of the travel, the autonomous traveling unit 100A can provide the service to various types of users. The autonomous traveling unit 100A may corresponds to a driving portion in the present disclosure.

The autonomous traveling unit 100A is configured, further including a sensor 106, a position information acquiring portion 108, the merchandise information acquiring portion 109, a travel driving portion 110, a transportation driving portion 111, a communicating portion 112 and a storing portion 114. The autonomous traveling unit 100A operates by power supplied from a battery.

The sensor 106 is means that performs sensing of the surroundings of the vehicle, and, typically, a stereo camera, a laser scanner, Light Detection and Ranging, a Laser Imaging Detection and Ranging (LiDAR), a radar and the like are included. Information acquired by the sensor 106 is transmitted to the controlling portion 104. The sensor 106 includes a sensor for the own vehicle to perform autonomous travel. The sensor 106 includes a camera provided on a body of the autonomous traveling unit 100A. For example, the camera can be an imaging device using an image sensor such as charged-coupled devices (CCD), a metal-oxide-semiconductor (MOS), a complementary metal-oxide-semiconductor (CMOS) and the like. Further, the sensor 106 includes a weight sensor and can measure weights and the like of placed merchandise G.

The position information acquiring portion 108 is means that acquires a current position of the autonomous traveling unit 100A. The position information acquiring portion 108 includes a receiver that receives a radio wave from a transmitter (for example, a beacon) arranged in the store SH and a parking lot P and the like. A plurality of transmitters are arranged in the store SH and the parking lot P and periodically emit radio waves with a particular frequency or in a particular signal format. Here, the position information acquiring portion 108 receives radio waves from at least three transmitters as position information and transmits the acquired position information to the controlling portion 104. Note that the position acquisition technique with regard to the position information acquiring portion 108 may be a technique other than the above. For example, a marker positioning technique in which a technique of estimating a camera position or a posture (an angle) used in augmented reality (AR) is applied may be adopted as the position information acquisition technique. The marker positioning technique makes it possible to, by photographing a plurality of markers attached to wall surfaces or pillars in the store SH or the like by a camera as a photographing device of the position information acquiring portion 108, obtain position information based on photographing data thereof. Further, the position information acquiring portion 108 may include a Global Positioning System (GPS) receiver. The GPS receiver as a satellite signal receiver receives signals from a plurality of GPS satellites. Each GPS satellite is an artificial satellite that orbits around the earth. A satellite positioning system, that is, a navigation satellite system (NSS) is not limited to the GPS. The position information may be detected based on signals from various satellite positioning systems. The NSS is not limited to a global navigation satellite system. The Quasi-Zenith Satellite System, for example, "Galileo" of Europe or "Michibiki" of Japan, which is integrally operated with the GPS, can be included in the NSS.

The merchandise information acquiring portion 109 acquires information about merchandise G stored in a merchandise storing portion GU configured to be movable together with an autonomous traveling portion RU of the autonomous traveling unit 100A. In the present embodiment, each piece of merchandise G is provided with a tag having merchandise information. The merchandise information acquiring portion 109 reads the information of the tags and transmits the information about the merchandise G in the merchandise storing portion GU to the controlling portion 104. In the present embodiment, the tags attached to the merchandise G are RF tags, and the merchandise information acquiring portion 109 is configured as a reader/writer of the RF tags. With a radio wave emitted by the merchandise information acquiring portion 109 as a power source, the RF tags of the merchandise G cause information included in their memories to be electronic signals and transmits the electronic signals. By the merchandise information acquiring portion 109 receiving (acquiring) the electronic signals, the information about the merchandise G is acquired. The information about the merchandise G is transmitted to the controlling portion 104. As the information about the merchandise G, merchandise IDs for identifying the merchandise is given as an example. Note that the merchandise information acquiring portion 109 may be configured including a photographing device. For example, the merchandise information acquiring portion 109 may include a camera as the photographing device and acquire the information about the merchandise G by image analysis by the camera.

The controlling portion 104 is a computer that performs control of the autonomous traveling unit 100A based on information acquired from the sensor 106, the position information acquiring portion 108 and the like. The controlling portion 104 is an example of control means that controls travel of the autonomous traveling unit 100A, transportation work for various kinds of merchandise, and the like.

The controlling portion 104 has a CPU and a main storing portion, and executes information processing by a program. The CPU is also referred to as a processor. The main storing portion of the controlling portion 104 is an example of a main memory. The CPU of the controlling portion 104 executes a computer program executably developed in the main storing portion to provide various kinds of functions. The main storing portion of the controlling portion 104 stores the computer program executed by the CPU and/or data and the like. The main storing portion of the controlling portion 104 is a dynamic random access memory (DRAM), a static random access memory (SRAM), a read-only memory (ROM) or the like.

The controlling portion 104 is connected to the storing portion 114. The storing portion 114 is a so-called external storing portion and is used as a storage area that assists the main storing portion of the controlling portion 104. The storing portion 114 stores the computer program executed by the CPU of the controlling portion 104 and/or data and the like. The storing portion 114 is a hard disk drive, a solid state drive (SSD) or the like.

The controlling portion 104 has an information acquiring portion 1041, a plan generating portion 1042, an environment detecting portion 1043, a task controlling portion 1044, a merchandise managing portion 1045, a settlement processing portion 1046 and an information providing portion 1047 as functional modules. Each functional module is realized by executing the program stored in the main storing portion and/or the storing portion 114 by the controlling portion 104, that is, the CPU of the controlling portion 104.

The information acquiring portion 1041 acquires information such as an operation instruction from the server apparatus 200. The operation instruction can include information about the service that the autonomous traveling unit 100A provides. Further, the information acquiring portion 1041 acquires information about the own vehicle regularly or irregularly and causes the information to be stored into an own vehicle information database 1141 of the storing portion 114. The information acquiring portion 1041 also acquires information from the user apparatuses 300. When the user apparatus 300 of a user U who uses the autonomous traveling unit 100A is the user apparatus 300A, the information acquiring portion 1041 can acquire a user ID and the like specific to the user apparatus 300A from the user apparatus 300A. Further, when the user apparatus 300 of the user U who uses the autonomous traveling unit 100A is the user apparatus 300A, the information acquiring portion 1041 can acquire various kinds of position information, for example, position information about the user apparatus 300A from the user apparatus 300A.

The plan generating portion 1042 generates an operation plan of the own vehicle based on an operation instruction acquired from the server apparatus 200. The operation plan generated by the plan generating portion 1042 is transmitted to the task controlling portion 1044 described later. In the present embodiment, the operation plan can be data and the like for following the user apparatus 300A associated with the autonomous traveling unit 100A especially in the store SH. Further, in the present embodiment, the operation plan includes movement routes to various kinds of destination positions, outside the store SH. As another example of the data included in the operation plan, data indicating processing to be performed by the own vehicle at points on the travel routes. As the processing to be performed by the own vehicle on the travel routes, for example, "transportation of the merchandise G" is included, but the processing is not limited thereto.

In the present embodiment, the plan generating portion 1042 acquires an instruction of an operation within a predetermined range including the inside of the store SH and the parking lot P, from the server apparatus 200. This operation instruction includes a travel plan including various kinds of position information about positions to be departure positions and/or destination positions inside and outside the store SH. Position information acquired from the user apparatuses 300 via the information acquiring portion 1041 is associated with this travel plan. For example, at the time of carrying purchased merchandise to a user□s vehicle, position information about a position (a first point) P1 of the targeted user□s vehicle can be acquired from the user apparatuses 300. Position information about a point (a second point) P2 to return to from the user□s vehicle is provided from the server apparatus 200 here, but it may be directly provided for the autonomous traveling unit 100A from a computer SHC of the store SH, for example. Note that, though the computer SHC of the store SH may be integrated with the server apparatus 200, the computer SHC is provided separately from the server apparatus 200 here and can communicate with the autonomous traveling units 100, the server apparatus 200 and the user apparatuses 300. The computer SHC has a configuration similar to a configuration of the user apparatuses 300 to be described later.

The environment detecting portion 1043 detects an environment around the vehicle based on data acquired by the sensor 106. Detection targets are, for example, the number and positions of lanes, the number and positions of vehicles existing around the own vehicle, the number and positions of obstacles (for example, pedestrians, bicycles, structures, buildings and the like) existing around the own vehicle, structure of roads, traffic signs and the like, but are not limited thereto. The detection target may be anything if it is such that it is necessary to perform autonomous travel. Further, the environment detecting portion 1043 may track a detected object. For example, a relative speed of an object may be determined from a difference between coordinates of the object detected one step before and current coordinates of the object. Data about the environment detected by the environment detecting portion 1043 (hereinafter, environmental data) is transmitted to the task controlling portion 1044 described later.

The task controlling portion 1044 controls working of the autonomous traveling portion RU of the own vehicle, that is, travel based on the operation plan generated by the plan generating portion 1042, the environmental data generated by the environment detecting portion 1043 and the position information about the own vehicle acquired by the position information acquiring portion 108. In other words, the task controlling portion 1044 is responsible for a function as a movement controlling portion of the autonomous traveling portion RU. For example, the task controlling portion 1044 causes the autonomous traveling portion RU of the own vehicle to autonomously travel so as to follow the user apparatus 300A of the user U or travel along a predetermined route. At this time, the task controlling portion 1044 causes the autonomous traveling portion RU of the own vehicle to autonomously travel in a manner that an obstacle does not enter a predetermined safety area with the own vehicle as a center. As for a method for causing the autonomous traveling portion RU of the autonomous traveling unit 100A to autonomously travel, a publicly known method can be adopted. Further, the task controlling portion 1044 executes tasks other than travel based on the operation plan generated by the plan generating portion 1042. As the tasks, working of a transportation machine for delivering merchandise to various kinds of vehicles is given as an example.

The merchandise managing portion 1045 manages information about the merchandise G received from the merchandise information acquiring portion 109. Especially the information about the merchandise G managed here is information about unsettled merchandise. Here, what the merchandise G in the merchandise storing portion GU is and how many pieces of merchandise are stored into the own vehicle information database 1141 of the storing portion 114. The merchandise managing portion 1045 also performs to eliminate the piece of merchandise G from the storing portion 114 when a piece of merchandise G that has put into the merchandise storing portion GU once is removed before completion of settlement. Note that, here, each time change in the merchandise G in the merchandise storing portion GU is recognized, the merchandise managing portion 1045 updates the information about the merchandise G in the own vehicle information database 1141 of the storing portion 114. However, the merchandise managing portion 1045 may acquire information about the merchandise G in the merchandise storing portion GU and store the information into the storing portion 114 only when the autonomous traveling unit 100A provided with the merchandise storing portion GU reaches a settlement area SC of the store SH. In FIG. 3, "G1×2, G3×1, G4×1" is stored in a predetermined storage area of the own vehicle information database 1141 of the storing portion 114. This indicates that there are two pieces of first merchandise G1, one piece of third merchandise G3 and one piece of fourth merchandise G4 in the merchandise storing portion GU of the autonomous traveling unit 100A.

Further, the merchandise managing portion 1045 also performs user check for the user U who uses the autonomous traveling unit 100A. In the system S1, purchase of merchandise G is performed by automatic settlement processing. Therefore, only payable users can use the system S1. The merchandise managing portion 1045 refers to the server apparatus 200 for user information of the own vehicle information database 1141, for example, a user ID. Thereby, it can be judged whether a user who uses the merchandise purchase service of the system S1, for example, the user U associated with the user apparatus 300A is a user who can use the service or not. If the user U is a user who cannot use the merchandise purchase service of the system S1, the merchandise managing portion 1045 transmits a signal to that effect to the plan generating portion 1042. As a result, the autonomous traveling unit 100A does not travel with the user, and can be into a waiting state at a predetermined waiting place.

The settlement processing portion 1046 performs settlement of the merchandise G in the merchandise storing portion GU of the autonomous traveling unit 100A. Here, the settlement processing portion 1046 acquires information about a price of each piece of merchandise G from the computer SHC in the store SH via the information acquiring portion 1041 and stores the information into a merchandise database 1143 of the storing portion 114. The information about merchandise/price relationship may be acquired from the server apparatus 200. When reaching the settlement area SC provided at an exit of the store SH, the settlement processing portion 1046 of the autonomous traveling unit 100A calculates a price of the merchandise G in the merchandise storing portion GU using the merchandise database 1143. Then, the settlement processing portion 1046 communicates with a settlement managing portion 2044 of the server apparatus 200 to automatically perform settlement processing of the merchandise in the merchandise storing portion GU. When the settlement processing is completed, the settlement processing portion 1046 transmits settlement completion information about the merchandise G (for example, G1, G3 and G4) in the merchandise storing portion GU of the autonomous traveling unit 100, which is merchandise G in the store SH, to the plan generating portion 1042. Thereby, it becomes possible for the plan generating portion 1042 to generate an operation plan so as to enable travel control of the autonomous traveling portion RU of the autonomous traveling unit 100A to the first point P1 where a car UC of the user U exists.

The information providing portion 1047 provides information about the own vehicle for the server apparatus 200. This provision may be performed regularly or irregularly.

The travel driving portion 110 is means that causes the autonomous traveling portion RU of the autonomous traveling unit 100A to travel, based on an instruction generated by the task controlling portion 1044. The travel driving portion 110 is configured, for example, including a motor for driving wheels, an inverter, a brake, a steering mechanism, a secondary battery and the like.

The transportation driving portion 111 is means that causes the transportation machine provided on the autonomous traveling portion RU of the autonomous traveling unit 100A to work, based on an instruction generated by the task controlling portion 1044. The transportation driving portion 111 is configured, for example, including a hydraulic mechanism and the like.

The communicating portion 112 has communication means for connecting the autonomous traveling unit 100A to the network N. In the present embodiment, the autonomous traveling unit 100A can communicate with other apparatuses, for example, the server apparatus 200 and the user apparatus 300A via the network N. Note that the communicating portion 112 may further have communication means for the autonomous traveling unit 100A, which is the own vehicle, to perform inter-vehicle communication with the other the autonomous traveling units 100 (100B, . . . ).

Next, the server apparatus 200 will be described. The server apparatus 200 is an apparatus that provides information about various operation instructions, such as information about a service of each of the plurality of autonomous traveling units 100. Further, in the present embodiment, the server apparatus 200 is an apparatus that performs settlement processing of merchandise in the autonomous traveling units 100.

Figure 4:
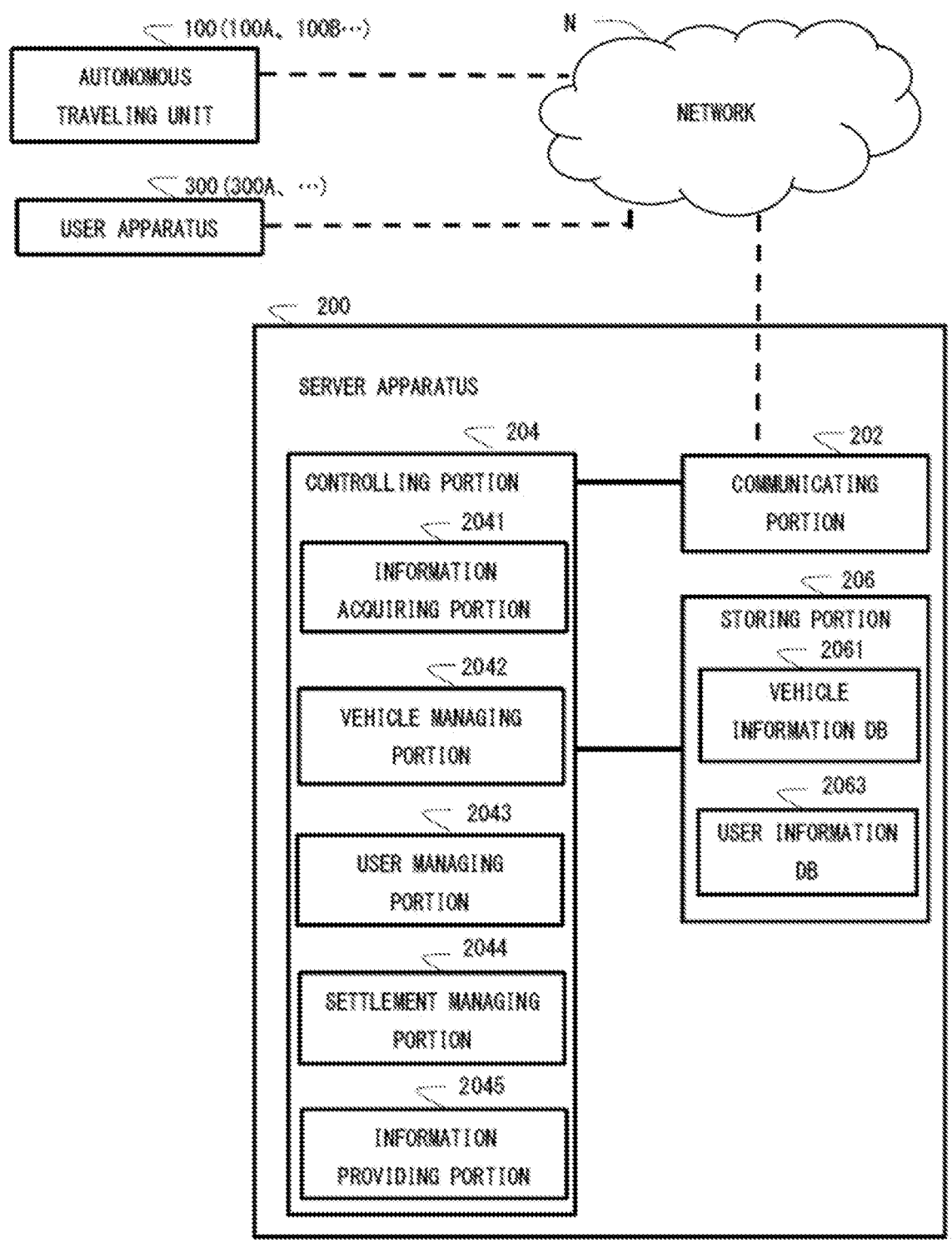
FIG. 4 is a block diagram schematically illustrating the configuration of the system of FIG. 1 and is a diagram illustrating especially a configuration of a server apparatus.

The server apparatus 200 is an information processing apparatus and is configured having a communicating portion 202, a controlling portion 204 and a storing portion 206 as illustrated in FIG. 4. The communicating portion 202 is similar to the communicating portion 112 and has a communication function for connecting the server apparatus 200 to the network N. The communicating portion 202 of the server apparatus 200 is a communication interface for performing communication with the autonomous traveling units 100 and the user apparatuses 300 via the network N. The controlling portion 204 has a CPU and a main storing portion similarly to the controlling portion 104 and executes information processing by a program. Of course, this CPU is also a processor, and the main storing portion of the controlling portion 204 is also an example of a main memory. The CPU of the controlling portion 204 executes a computer program executably developed in the main storing portion to provide various kinds of functions. The main storing portion of the controlling portion 204 stores the computer program executed by the CPU and/or data and the like. The main storing portion of the controlling portion 204 is a DRAM, an SRAM, a ROM or the like.

The controlling portion 204 is connected to the storing portion 206. The storing portion 206 is an external storing portion and is used as a storage area that assists the main storing portion of the controlling portion 204. The storing portion 206 stores the computer program executed by the CPU of the controlling portion 204 and/or data and the like. The storing portion 206 is a hard disk drive, an SSD or the like.

The controlling portion 204 is means that is responsible for control of the server apparatus 200. As illustrated in FIG. 4, the controlling portion 204 has an information acquiring portion 2041, a vehicle managing portion 2042, a user managing portion 2043, a settlement managing portion 2044 and an information providing portion 2045 as functional modules. Each of these functional modules is realized by executing the program stored in the main storing portion and/or the storing portion 206 by the CPU of the controlling portion 204.

The information acquiring portion 2041 acquires various kinds of information from the autonomous traveling units 100 and the user apparatuses 300. Then, the acquired information is transmitted to the vehicle managing portion 2042, the user managing portion 2043, the settlement managing portion 2044 and the like. The information acquiring portion 2041 acquires position information and information of the own vehicle information database 1141 from the autonomous traveling units 100, for example, regularly, and transmits the information to the vehicle managing portion 2042. Furthermore, the information acquiring portion 2041 acquires information about registered users from the user apparatuses 300 and transmits the information to the user managing portion 2043. Further, when acquiring information about settlement processing from any of the autonomous traveling units 100, the information acquiring portion 2041 transmits the information to the settlement managing portion 2044.

The vehicle managing portion 2042 manages information about the plurality of autonomous traveling units 100 under the management of the vehicle managing portion 2042. Specifically, the vehicle managing portion 2042 receives information such as data about the autonomous traveling units 100 from the plurality of autonomous traveling units 100 via the intonation acquiring portion 2041 and causes the information to be stored into a vehicle information database 2061 of the storing portion 206. As the information about the autonomous traveling units 100, position information and vehicle information is used. The vehicle information is, for example, an identifier, a purpose/classification, information about a waiting point, a body size, a load capacity, a travelable distance at the time of being fully charged, a travelable distance at a current point of time, a current status and the like about each of the autonomous traveling units 100.

The user managing portion 2043 stores the information about the registered users into a user information database 2063 of the storing portion 206. When acquiring information about a user who wants to use an autonomous traveling unit 100 via the information acquiring portion 2041, the user managing portion 2043 searches the user information database 2063 based on information about the user. When information to the effect that use is prohibited is recorded for the user who desires use, for example, when the user has a predetermined amount of debt or more, the user managing portion 2043 transmits use prohibition information to the autonomous traveling units 100. On the other hand, when the information to the effect that use is prohibited is not recorded for the user who desires use, information is not especially transmitted to the autonomous traveling units 100, but intonation indicating permission of use may be transmitted.

Based on the acquired user information, the settlement managing portion 2044 executes settlement processing of merchandise G using a predetermined bank account or the like according to information registered with the user information database 2063. When the settlement processing is completed, the settlement managing portion 2044 transmits settlement completion information to the autonomous traveling unit 100. At this time, the settlement managing portion 2044 may store a relationship between the user and the purchased merchandise so that the relationship is available for marketing and the like afterwards.

The information providing portion 2045 provides information about various operation instructions to each of the autonomous traveling units 100 according to a predetermined program. Here, especially, based on request information from the computer SHC of the store SH, an operation instruction to the autonomous traveling unit 100 about the store SH and the parking lot P in the system S1 is generated. To generate the operation instruction, the information providing portion 2045 can refer to a map information database of the storing portion 206. Note that this operation instruction is such that input from the computer SHC of the system S1 is reflected on. For example, the operation instruction can include data specifying a travelable range of the autonomous traveling unit 100 in the system S1, a travel speed limit and position information about the second point P2. Therefore, this operation instruction specifies an outline of an operation plan of the autonomous traveling unit 100. As already described, details of the operation plan of the autonomous traveling unit 100 is generated by the plan generating portion 1042 of the autonomous traveling unit 100.

Next, the user apparatuses 300 will be described. The user apparatuses 300 are, for example, mobile terminals, smartphones, personal computers and the like. As an example, the user apparatus 300A in FIG. 5 has a communicating portion 302, a controlling portion 304 and a storing portion 306. The communicating portion 302 and the storing portion 306 of the user apparatus 300A are similar to the communicating portion 202 and the storing portion 206 of the server apparatus 200, respectively. Furthermore, the user apparatus 300A has a displaying portion 308 and an operating portion 310. The displaying portion 308 is, for example, a liquid crystal display, an electroluminescent display or the like. The operating portion 310 may be, for example, a keyboard, a pointing device or the like. More specifically, in the present embodiment, the operating portion 310 includes a touch panel and is substantially integrated with the displaying portion 308.

The controlling portion 304 has a CPU and a main storing portion similarly to the controlling portion 204 of the server apparatus 200. The CPU of the controlling portion 304 executes an application program (hereinafter, an application) 3061 stored in the storing portion 306. The application 3061 is an application program for accessing information delivered from a web browser, the server apparatus 200 or the autonomous traveling units 100. The application 3061 has a GUI, accepts input, for example, access by the user U, and transmits it to the computer SHC, the autonomous traveling units 100 or the server apparatus 200 via the network N. The user U can input information to the effect that he wants to use the system S1, via the user apparatus 300. Though the input is transmitted to the computer SHC of the store SH from the user apparatus ⊃ 300A here, the input may be transmitted to the computer SHC via the server apparatus 200 or may be transmitted to the autonomous traveling units 100.

By the user U of the user apparatus 300A pressing a switch on the displaying portion 308 while the application 3061 is working, the user apparatus 300A acquires position information from a position information acquiring portion 311. In this way, the user U is enabled to store information about the position (the first position) P1 of his own car UC into the user apparatus 300A in the parking lot P of the store SH and transmit the information about the first position P1 to the autonomous traveling units 100 in the store SH together with his user information. Note that, though the position information acquiring portion 311 is configured similarly to the position information acquiring portions 108 of the autonomous traveling units 100 here, the position information acquiring portion 311 may have a different configuration.

Figure 5:
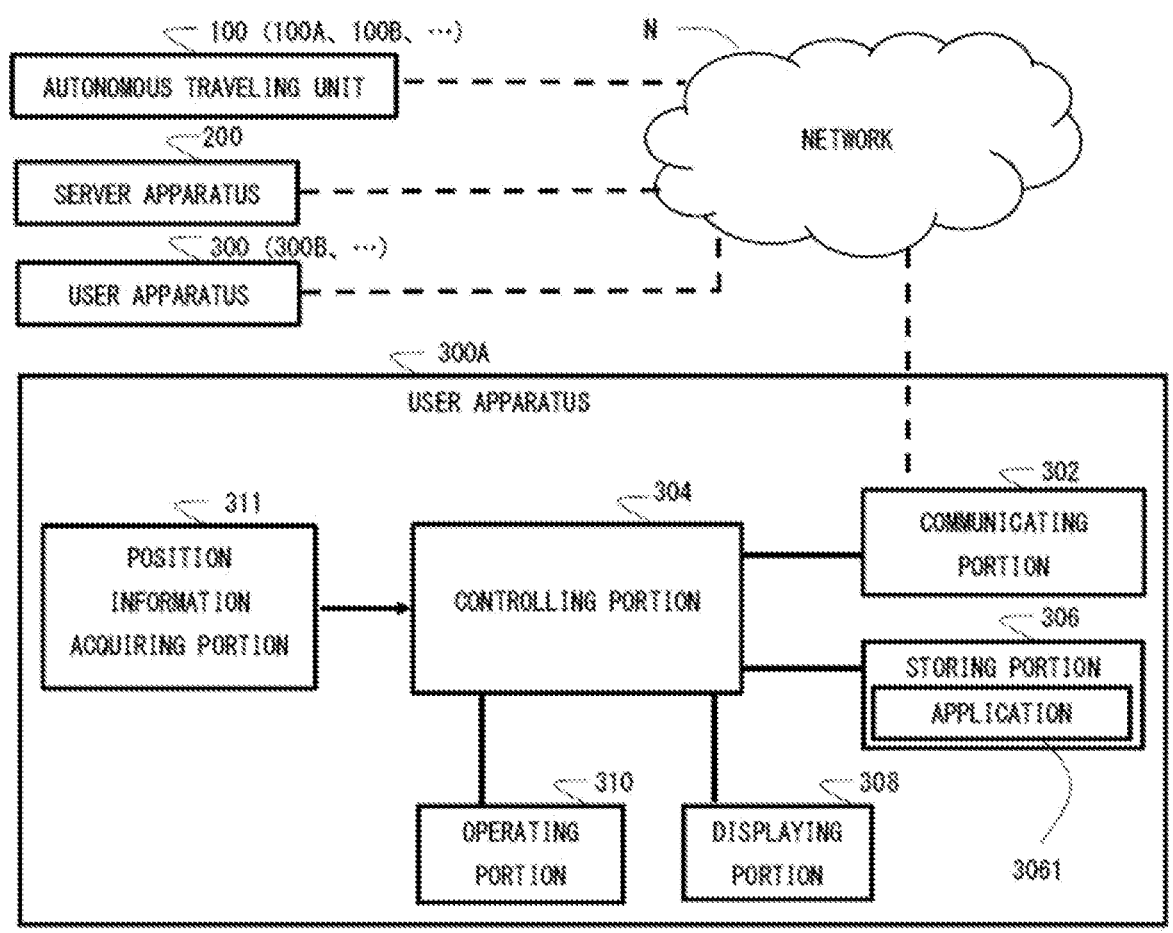
FIG. 5 is a block diagram schematically illustrating the configuration of the system of FIG. 1 and is a diagram illustrating especially a configuration of a user apparatus.

Note that, in FIGS. 3, 4 and 5, the autonomous traveling units 100, the server apparatus 200 and the user apparatuses 300 are connected via the same network N. However, this connection may be realized by a plurality of networks. For example, a network connecting the autonomous traveling units 100 and the server apparatus 200 and a network connecting the server apparatus 200 and the user apparatuses 300 may be different networks.

Figure 6:
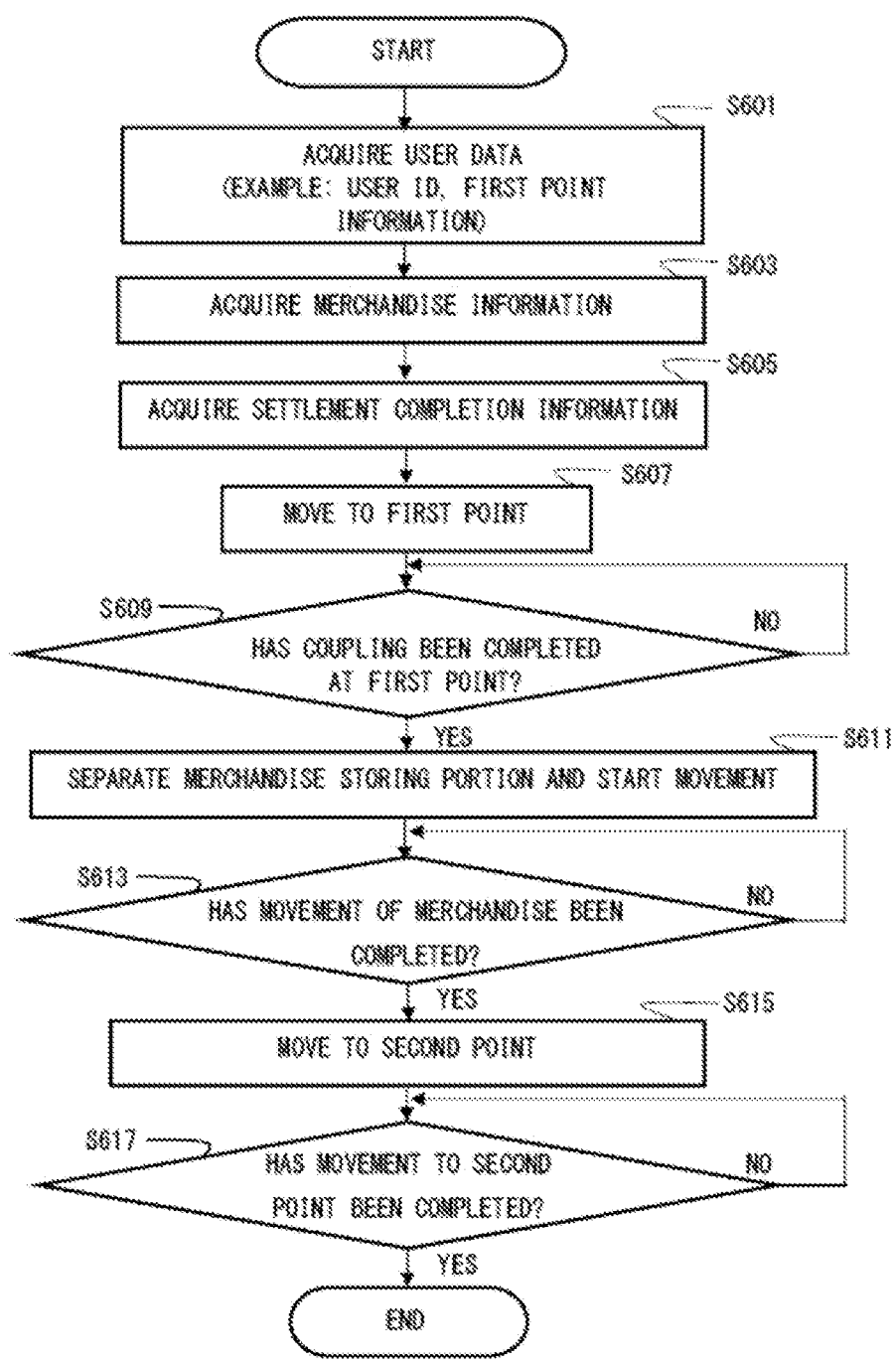
FIG. 6 is a flowchart in an information processing apparatus of the autonomous traveling unit in the system of FIG. 1.

A process in the system S1 having the above configuration will be described based on a flowchart of FIG. 6. Note that the process of FIG. 6 is a process by the controlling portion 104 of the information processing apparatus 102 of the autonomous traveling unit 100A. Hereinafter, description will be made on the assumption that a user who uses the autonomous traveling unit 100A is the user U of the user apparatus 300A.

For example, when the user U goes to the store SH from his home H by the car UC and parks the car UC in the parking lot P of the store SH to enter the store SH, he performs input to start use of the service from an operation screen of the application 3061 on the user apparatus 300A. Thereby, the computer SHC of the store SH to which the information is transmitted from the user apparatus 300A associates the autonomous traveling unit 100A in an unused state in the store SH with the user apparatus 300A of the user U, and transmits information to that effect to the user apparatus 300A. To the autonomous traveling unit 100A, the user information about the user U, for example, a user ID and position information about the car UC of the user U stored as described above, that is, the information about the first position P1 are transmitted from the user apparatus 300A. These are acquired by the controlling portion 104 of the autonomous traveling unit 100A and stored into the own vehicle information database 1141 of the storing portion 114 (step S601).

The autonomous traveling unit 100A associated with the user U communicates with the server apparatus 200 to confirm whether use by the use U may be permitted or not as described above. Further, the autonomous traveling unit 100A causes a merchandise storing portion GU to be placed on the autonomous traveling portion RU of the autonomous traveling unit 100A, as a part where merchandise selected by the user U in the store SH is to be put in. To place the merchandise storing portion GU on the autonomous traveling portion RU and combine them is automatically executed by the computer SHC in the store SH. However, it may be executed by transmission of a request from the autonomous traveling unit 100A to a place where the merchandise storing portions GU are managed. It is also possible for the user U to manually combine the merchandise storing portion GU with the autonomous traveling portion RU. Note that, here, the autonomous traveling unit 100A associated with the user U as described above automatically tracks and follows the user apparatus 300A based on position information from the user apparatus 300A of the user U. However, the autonomous traveling unit 100A may be manually moved by the user U.

By having the user apparatus 300A in the store SH and being followed by the autonomous traveling unit 100A, the user can use the autonomous traveling unit 100A like a shopping cart. In the store SH, the user U can put merchandise G that he desires to purchase, into the merchandise storing portion GU of the autonomous traveling unit 100A. Here, as illustrated in FIG. 1, two pieces of merchandise G1, one piece of merchandise G3 and one piece of merchandise G4 have been put in the merchandise storing portion GU of the autonomous traveling unit 100A by the user U as described above. Information about these pieces of merchandise G is read by the merchandise information acquiring portion 109 and acquired by the merchandise managing portion 1045, and, thereby, the information is stored into the own vehicle information database 1141 of the storing portion 114 (step S603).

When the user reaches an exit SHout of the store SH, and the autonomous traveling unit 100A reaches the settlement area SC provided there, the settlement processing portion 1046 of the autonomous traveling unit 100A works. The settlement processing portion 1046 calculates a price of the merchandise G in the merchandise storing portion GU using the merchandise database 1143. Then, the settlement processing portion 1046 communicates with the settlement managing portion 2044 of the controlling portion 204 of the server apparatus 200 to automatically perform settlement processing of the merchandise G in the merchandise storing portion GU, and acquires settlement completion information (step S605).

When acquiring the settlement completion information about the merchandise G in the merchandise storing portion GU, the settlement processing portion 1046 transmits the settlement completion information to the plan generating portion 1042. Thereby, the plan generating portion 1042 acquires the settlement completion information, generates an operation plan, with the first point P1 of the own vehicle information database 1141 of the storing portion 114 as a destination position after that, transmits the operation plan to the task controlling portion 1044 and causes the travel driving portion 110 to perform drive. In other words, as indicated by an arrow A11 in FIG. 1, the task controlling portion 1044 controls working of the autonomous traveling portion RU of the autonomous traveling unit 100A to cause the merchandise storing portion GU that is movable together with the autonomous traveling portion RU to move to the first point P1 (step S607).

When the autonomous traveling portion RU of the autonomous traveling unit 100A provided with the merchandise storing portion GU reaches the first point P1, that is, the car UC of the user U in the parking lot P outside the store SH here, the autonomous traveling portion RU is coupled with the car UC of the user U in the present embodiment (a positive judgment at step S609). This coupling occurs by predetermined parts being attracted to each other by magnets. However, this may be mechanically or electrically realized by various mechanisms. Note that this coupling is not limited to the autonomous traveling portion RU of the autonomous traveling unit 100A being directly in contact with the car UC of the user U, but can include positioning of the autonomous traveling portion RU at a predetermined position away from the car UC by a predetermined distance so as to facilitate delivery of the merchandise G in the merchandise storing portion GU.

Thereby, automatically, especially by the transportation machine worked by working of the transportation driving portion 111 here, the merchandise storing portion GU is separated from the autonomous traveling portion RU of the autonomous traveling unit 100A, and movement to a predetermined part of the car UC is started (step S611). In FIG. 2, the movement of the merchandise storing portion GU to the car UC is indicated by an arrow A12. This movement may be performed by a person such as the user U or may be performed in cooperation between a person and a machine or the like. Note that the purchased merchandise G leaves the autonomous traveling portion RU of the autonomous traveling unit 100A by this movement.

The autonomous traveling portion RU of the autonomous traveling unit 100A is provided with the weight sensor described above to detect completion of movement of the merchandise storing portion GU including the purchased merchandise G. The information acquiring portion 1041 can acquire information indicating that the movement of the merchandise storing portion GU including the purchased merchandise G has been completed, based on input from the weight sensor (a positive judgment at step S613). After the purchased merchandise G has left the autonomous traveling portion RU as described above, the plan generating portion 1042 reads information about the second point P2 specified in advance, from the storing portion 114. Then, the plan generating portion 1042 generates an operation plan, with the second point P2 as a destination position, transmits the operation plan to the task controlling portion 1044 and causes the travel driving portion 110 to perform drive. In other words, the controlling portion 104 causes the autonomous traveling portion RU of the autonomous traveling unit 100A to move to the second point as indicated by an arrow A13 in FIG. 2 (step S615). Note that, here, the second point is a predetermined position in the store SH and is the point P2 in FIGS. 1 and 2. More specifically, the second point P2 is a cart space for causing the autonomous traveling units 100 as shopping carts to wait, which is related to the store SH, here, but may be a place other than the cart space. As illustrate in FIG. 2, here, the autonomous traveling unit 100A, from the first point P1 can enter the store SH from the entrance SHin of the store SH and reach the second point P2. Note that the second point may be specified outside the store SH.

Then, when acquiring position information corresponding to position information about the second point as position information about the own vehicle, the autonomous traveling unit 100A, judges that movement to the second point has been completed (a positive judgment at step S617). Thereby, the autonomous traveling unit 100A, is into a waiting state at the second point P2 in the store SH, and the service in the system S1 ends.

As described above, according to the system S1, the settlement completion information is acquired about the merchandise G in the merchandise storing portion GU, which is merchandise G in the store SH, by the controlling portion 104 of the autonomous traveling unit 100A. After that, working of the autonomous traveling portion RU of the autonomous traveling unit 100A, is controlled so as to cause the merchandise storing portion GU to move to the first point P1 outside the store SH. In other words, the purchased merchandise G is automatically carried to the first point P1. Therefore, it becomes possible to eliminate inconvenience of the user U bringing the purchased merchandise G after purchasing the merchandise in the store SH.

Note that, though a first point P1 is a position of a user□s car in the first embodiment, it may be other places. For example, the first point P1 may be a position of the user□s home H illustrated in FIGS. 1 and 2. It may be inputted from the operation screen of the application 3061 of a user apparatus 300 that the user□s home H is set as the first point P1. In FIG. 2, a reference symbol "P1*a*" is attached to the user□s home H as the first point P1. However, in autonomous travel of the autonomous traveling unit 100 to the home H as the first point P1, it is recommended that the position information acquiring portion 108 has the GPS receiver described above.

Figure 7:
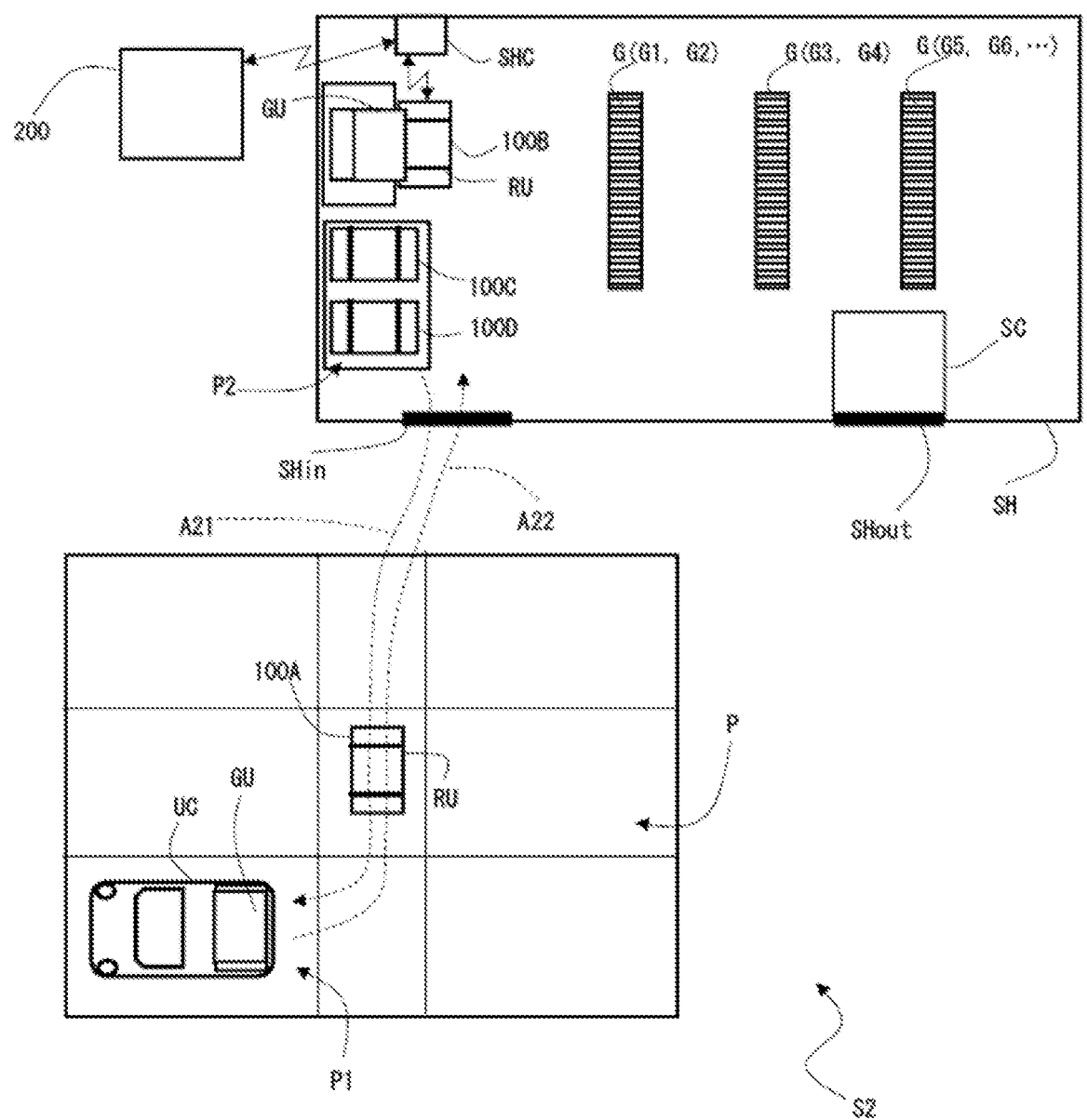
FIG. 7 is a conceptual diagram of a system according to a second embodiment of the present disclosure.
Figure 8:
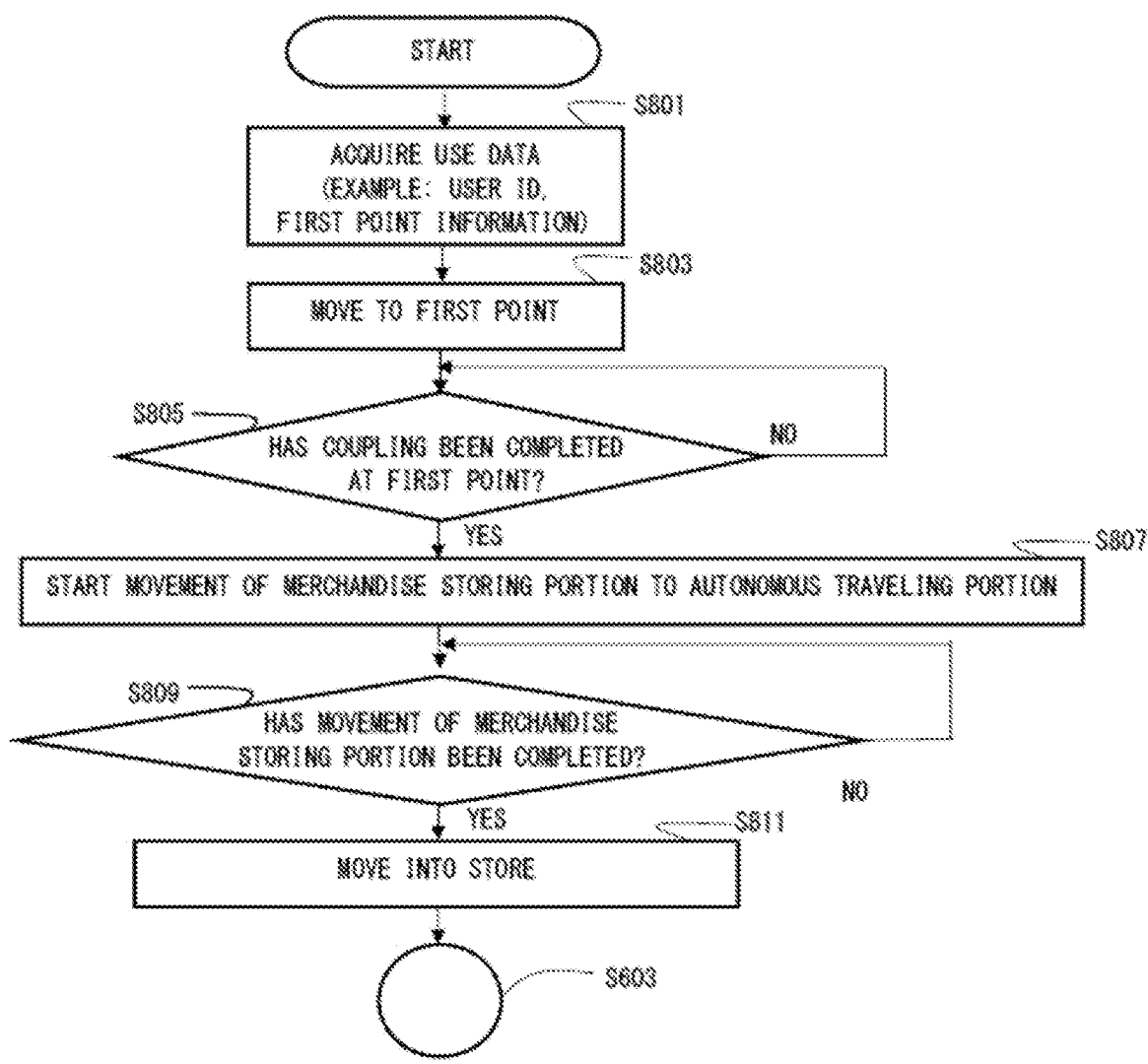
FIG. 8 is a flowchart in an information processing apparatus of an autonomous traveling unit in the system of FIG. 7.

Next, a second embodiment will be described based on FIGS. 7 and 8. Note that, hereinafter, the second embodiment will be described with regard to points different from the above first embodiment, and duplicated description will be omitted.

In a system S2 of the second embodiment, a box-type merchandise storing portion GU is separably provided in the car UC of the user U. The merchandise storing portion GU is configured with material that can be repeatedly used, and is, for example, made of synthetic resin. Note that the merchandise storing portion GU may have the same configuration as the merchandise storing portions GU of the first embodiment.

The user U parks the car UC in the parking lot P, and transmits the user information and position information about the first position P1 from the user apparatus 300A to the computer SHC. Thereby, the computer SHC assigns the autonomous traveling unit 100A to the user apparatus 300A and transmits the information from the user apparatus 300A to the autonomous traveling unit 100A. In this way, the autonomous traveling unit 100A acquires the user information (for example, the user ID) and the position information about the first position P1 from the user apparatus 300A (step S801).

Based on the acquired position information about the first position P1, the controlling portion 104 of the autonomous traveling unit 100A generates an operation plan, with the first position P1 as a destination position, and causes the travel driving portion 110 to work. Thereby, the autonomous traveling unit 100A provided with the autonomous traveling portion RU moves to the car UC at the first point P1 as indicated by an arrow A21 in FIG. 7 (step S803).

When being coupled with the car UC at the first point P1 similarly to step S609 described above (a positive judgment at step S805), the autonomous traveling unit 100A causes movement of the merchandise storing portion GU of the car UC to start (step S807). This movement is movement in a direction opposite to the direction at step S611 described above. Completion of the movement of the merchandise storing portion GU of the car UC can be judged from a working state of the transportation machine, but it may be detected using the weight sensor described above or the like. When it is judged that the merchandise storing portion GU of the car UC has completely moved onto the autonomous traveling portion RU of the autonomous traveling unit 100A (a positive judgment at step S809), the autonomous traveling unit 100A moves into the store SH (step S811). The movement into the store SH is performed based on an operation plan created based on position information about the entrance SHin of the store SH that is stored beforehand, as indicated by an arrow A22 in FIG. 7. Note that the movement of the autonomous traveling unit 100A into the store SH may be executed by control to follow the user apparatus 300A of the user U though the movement is outside the store SH. When the autonomous traveling unit 100A moves into the store SH, steps at and after step S603 of FIG. 6 are executed. Note that, in FIG. 8, illustration of the steps at and after step S603 will be omitted, and description thereof will be omitted.

As described above, in the second embodiment, the autonomous traveling unit 100A provided with the autonomous traveling portion RU comes to receive the merchandise storing portion GU outside the store SH and is used to purchase merchandise G in the store SH after that. Therefore, a user can receive purchased merchandise by his own merchandise storing portion GU. Therefore, the purchased merchandise is certainly included in the received merchandise storing portion GU in a state that the user desires, and it becomes possible to further increase the degree of satisfaction of the user.

Note that, in the first and second embodiments described above, a merchandise storing portion GU is separably provided on an autonomous traveling portion RU of an autonomous traveling unit 100. However, in an autonomous traveling unit 100, an autonomous traveling portion RU may be integrally configured with a merchandise storing portion GU, and the merchandise storing portion GU may be inseparable. An example of this will be further described.

Figure 10:
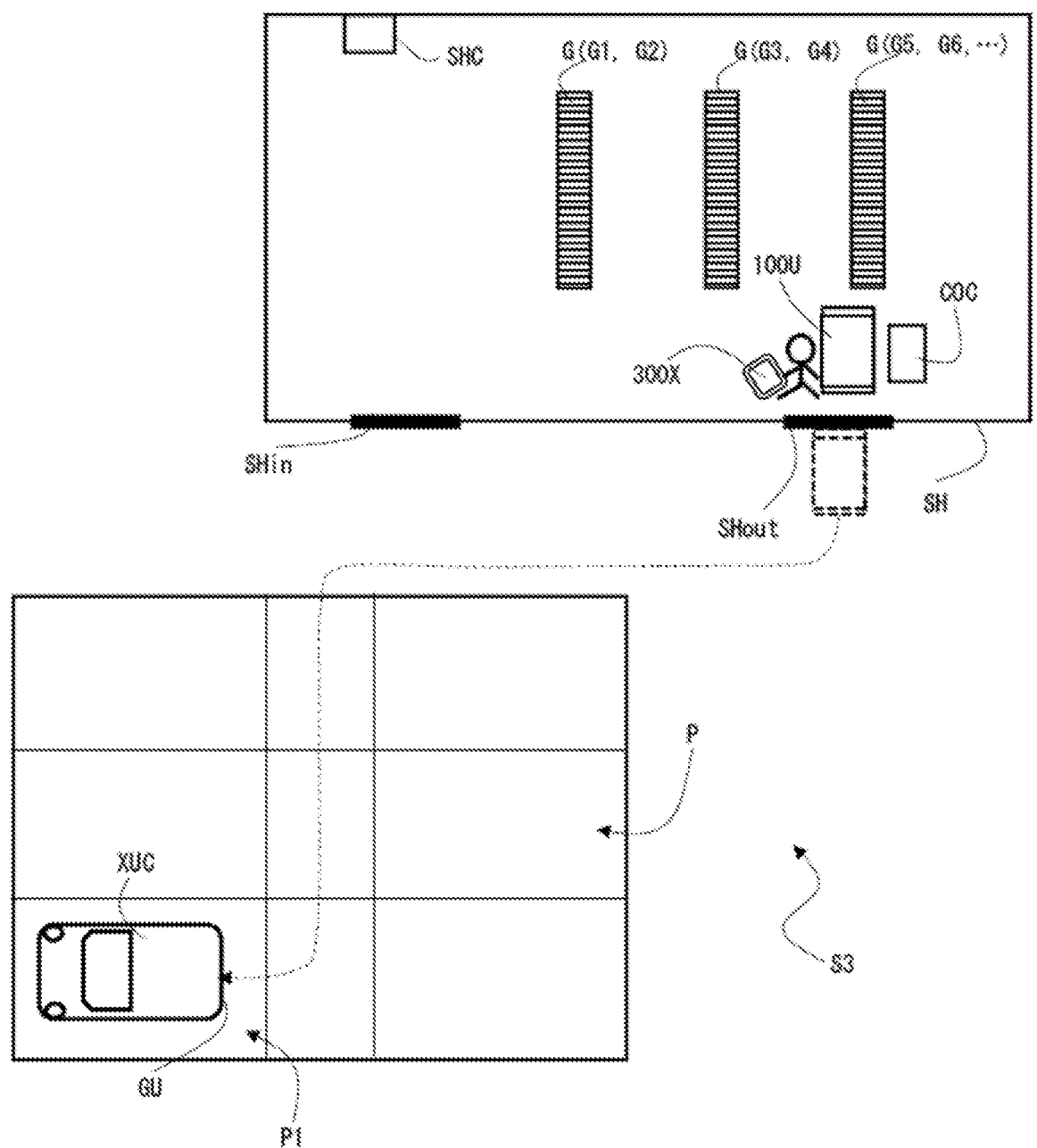
FIG. 10 is a conceptual diagram of the system of FIG. 9 in a situation different from FIG. 9.
Figure 11:
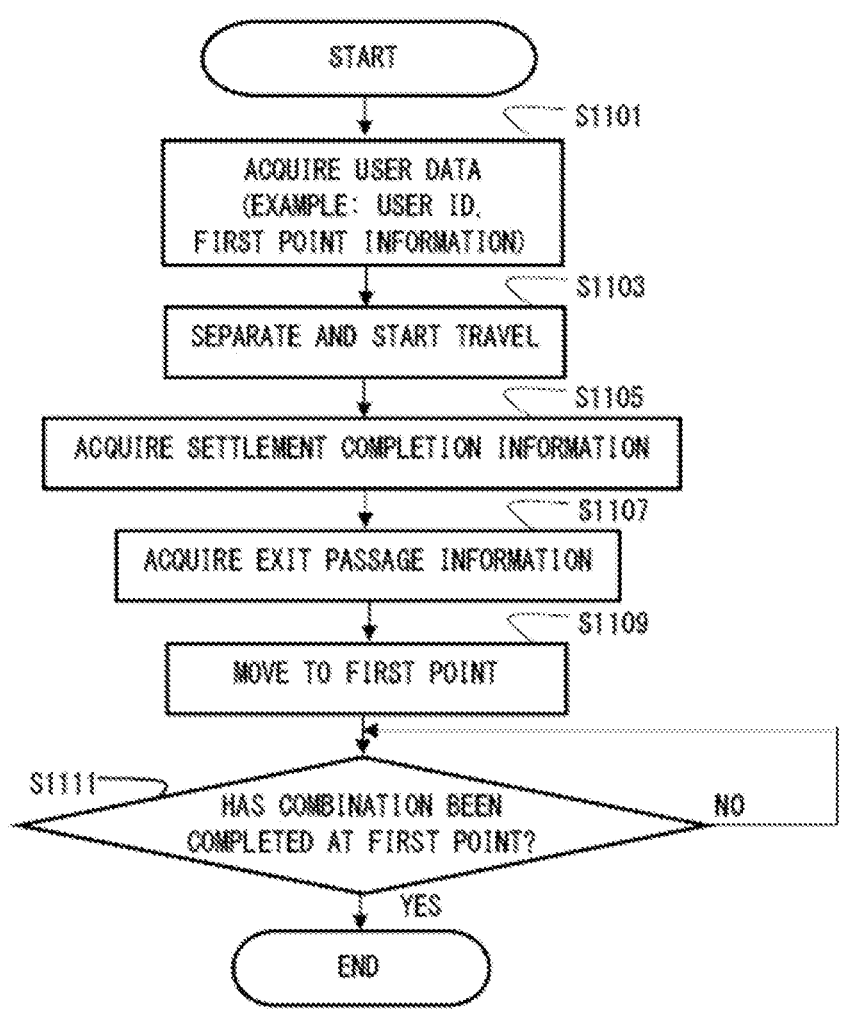
FIG. 11 is a flowchart in an information processing apparatus of an autonomous traveling unit in the system of FIG. 9.

Next, a third embodiment will be described based on FIGS. 9 to 11. Note that, hereinafter, the third embodiment will be described with regard to points different from the above second embodiment, and duplicated description will be omitted.

In a system S3 of the third embodiment, the autonomous traveling units 100 are not provided in the store SH but are associated with users□ cars. As an example, in a car XUC of a user X, an autonomous traveling unit 100U among the autonomous traveling units 100 is combinably and separably configured. In the present embodiment, the autonomous traveling unit 100U can get on, that is, can be included in the car XUC and combined, and can be separated from the car XUC as indicated by a broken line in FIG. 9. In a state of being separated from the car XUC, the autonomous traveling unit 100U autonomously travels by control of the controlling portion 104 of the information processing apparatus 102. In the present embodiment, each autonomous traveling unit 100 is configured, integrally having an autonomous traveling portion RU and a merchandise storing portion GU, and configured such that the autonomous traveling portion RU and the product storing portion GU are inseparable. Note that the autonomous traveling unit 100U may be adapted to be pulled by the car XUC instead of being included in the car XUC when being combined with the car XUC.

Furthermore, in the system S3, the autonomous traveling unit 100U does not have a settlement processing function though it can have the settlement processing function. In other words, the controlling portion 104 of the autonomous traveling unit 100U has neither the merchandise managing portion 1045 described above nor the settlement processing portion 1046 described above. Further, the autonomous traveling unit 100U does not have the merchandise information acquiring portion 109. Accordingly, the store SH is provided with a settlement processing portion (for example, a checkout counter) COC. Note that the settlement processing portion COC may be manned or unmanned.

The user X parks the car XUC in the parking lot P, inputs the first position P1 to a user apparatuses 300X, and presses a transmission button. Thereby, the controlling portion 104 of the autonomous traveling unit 100U of the car XUC receives and acquires user information and position information about the first position P1 (step S1101). As a result, the plan generating portion 1042 of the controlling portion 104 of the autonomous traveling unit 100U generates an operation plan of traveling while following the user apparatuses 300X of the user X, and moving to the car XUC at the first position P1 to be combined with the car XUC when a predetermined condition is satisfied. The task controlling portion 1044 that receives this operation plan separates the autonomous traveling unit 100U indicated by a broken line in FIG. 9 from the car XUC and causes the autonomous traveling unit 100U to start traveling while following the user apparatuses 300X of the user X at predetermined intervals (step S1103). In FIG. 9, it is indicated by arrows A31 and A32 that the separated autonomous traveling unit 100U is traveling while following the user X who goes into the store SH. Note that, in the store SH, the separated autonomous traveling unit 100U may communicate with the computer SHC to acquire various kinds of information in the store SH. For example, the autonomous traveling unit 100U may acquire map information about the inside of the store SH including arrangement of merchandise display shelves from the computer SHC and use the map information for autonomous traveling control to follow the user X.

Figure 9:
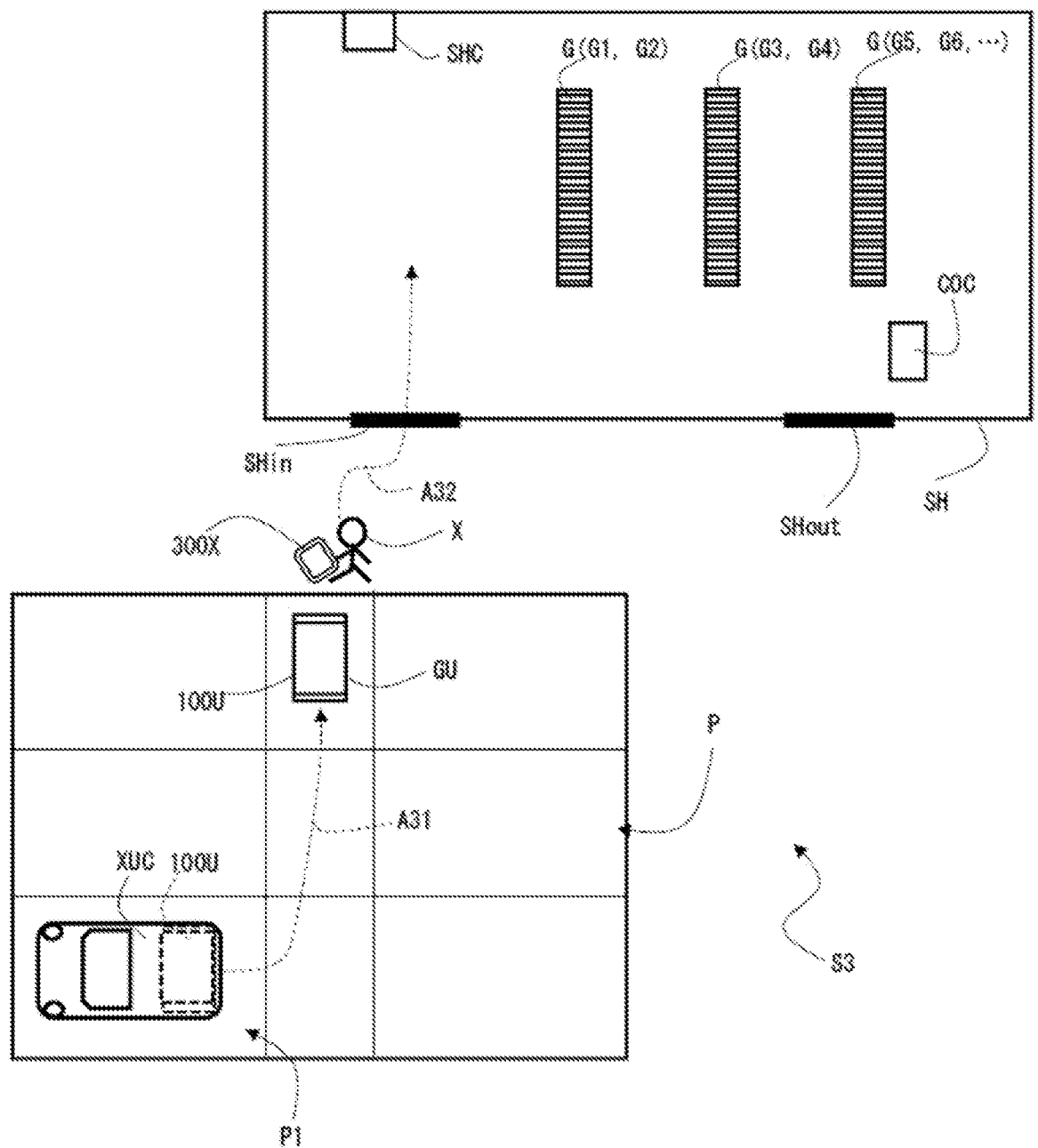
FIG. 9 is a conceptual diagram of a system according to a third embodiment of the present disclosure.

The user X enters the store SH as illustrated in FIG. 9 and can put merchandise G that he wants to purchase into the merchandise storing portion GU of the autonomous traveling unit 100U. Then, as illustrated in FIG. 10, the user X can move to the settlement processing portion COC in a state in which the merchandise G is in the merchandise storing portion GU and perform accounting processing. When the accounting processing ends, settlement completion information is transmitted from the settlement processing portion COC to the autonomous traveling unit 100U here. Thereby, the autonomous traveling unit 100U acquires the settlement completion information (step S1105).

After the completion of settlement, by the user X exiting the exit SHout of the store SH, the autonomous traveling unit 100U passes through the exit SHout. At this time, the autonomous traveling unit 100U acquires exit passage information transmitted from a transmitter (for example, a beacon) at the exit SHout (step S1107). Thereby, the task controlling portion 1044 of the controlling portion 104 of the autonomous traveling unit 100U acquires the settlement completion information and judges that the autonomous traveling unit 100U has exited the store SH. Then, the task controlling portion 1044 of the controlling portion 104 of the autonomous traveling unit 100U executes movement to the car XUC at the first point P1 in the operation plan (step S1109).

Then, when the autonomous traveling unit 100U reaches the first point P1 and is combined with the car XUC (a positive judgment at step S1111), the process is completed. Note that the combination of the autonomous traveling unit 100U with the car XUC may be performed by magnets as described in the first embodiment or may be mechanically or electrically performed.

The above embodiments are mere examples, and the present disclosure can be appropriately changed and implemented within a range not departing from the gist of the disclosure thereof. The processes and/or means described in the present disclosure can be freely combined and implemented as far as technical contradiction does not occur.

For example, in the first and second embodiments described above, an autonomous traveling unit 100 starts movement to a first point after acquiring settlement completion information. In comparison, in the third embodiment described above, an autonomous traveling unit 100 starts movement to the first point after the settlement information is acquired, and the autonomous traveling unit 100 exits a store. However, in the systems S1 and S2 of the first and second embodiments, the movement of the autonomous traveling unit 100 to the first point may be executed after the settlement completion information is acquired, and the autonomous traveling unit 100 exits the store. Further, in the system S3 of the third embodiment, the movement of the autonomous traveling unit 100 to the first point may be executed at appropriate time after the settlement completion information is acquired, irrespective of whether the autonomous traveling unit 100 has exited the store or not. Further, the autonomous traveling unit 100 that can be combined with and separated from a car in the third embodiment may be utilized in the system of the first or second embodiment.

Further, a process described as being performed by one apparatus may be shared and executed by a plurality of apparatuses. For example, each of the server apparatus 200 that is an information processing apparatus, the computer SHC that is an information processing apparatus and/or the information processing apparatuses 102 of the autonomous traveling units 100 does not have to be one computer, but these may be configured as a system provided with a plurality of computers. Alternatively, a process described as being performed by a different apparatus may be executed by one apparatus. By what hardware configuration each function is realized in a computer system can be flexibly changed.

The present disclosure can be realized by supplying a computer program implemented with the functions described in the above embodiments to a computer, and one or more processors of the computer reading and executing the program. Such a computer program may be provided for the computer by a non-transitory computer-readable storage medium that can be connected to a system bus of the computer or may be provided for the computer via a network. The non-transitory computer-readable storage medium includes, for example, a disk of an arbitrary type such as a magnetic disk (a floppy (R) disk, a hard disk drive (HDD) and the like), an optical disk (a CD-ROM, a DVD disk, a Blu-ray disk and the like), a read-only memory (ROM), a random access memory (RAM), an EPROM, an EEPROM, a magnetic card, a flash memory, an optical card, and a medium of an arbitrary type that is appropriate for storing electronic commands.

What is claimed is:

1. An autonomous traveling unit comprising:
a driver including an autonomous traveling ability, the driver being configured to be movable together with a storage configured to store merchandise; and
a controller comprising at least one processor configured to execute
acquiring a user ID associated with a user from a user apparatus, the user ID being specific to the user apparatus,
referring to a server apparatus for user information about whether or not the user is a payable user who can use the autonomous traveling unit based on the acquired user ID, the server apparatus storing the user information in association with the user ID,
judging whether or not the user associated with the user ID is the payable user based on a result of reference to the server apparatus for the user information,
controlling the driver to wait at a predetermined waiting place in a case where the user associated with the user ID is not the payable user,
controlling the driver to travel with the user apparatus in a case where the user associated with the user ID is the payable user,
acquiring settlement completion information about the merchandise stored in the storage, the merchandise being merchandise in a store, and
controlling the driver to cause the storage to move to a first point outside the store after acquiring the settlement completion information.

2. The autonomous traveling unit according to claim 1, wherein controlling the driver to cause the storage to move to the first point is executed after the settlement completion information is acquired, and the autonomous traveling unit exits the store.

3. The autonomous traveling unit according to claim 1, wherein the acquisition of the settlement completion information is executed when the autonomous traveling unit exits the store.

4. The autonomous traveling unit according to claim 1, wherein the controller further executes acquiring position information about the first point.

5. The autonomous traveling unit according to claim 1, wherein the storage is separably provided on the driver.

6. The autonomous traveling unit according to claim 5, wherein the controller further executes separating the storage from the driver at the first point.

7. The autonomous traveling unit according to claim 5, wherein the controller further executes causing the driver to move the storage at the first point.

8. The autonomous traveling unit according to claim 1, wherein the first point is a position of a vehicle of a user.

9. The autonomous traveling unit according to claim 1, wherein the first point is a position of a home of a user.

10. The autonomous traveling unit according to claim 1, wherein
the autonomous traveling unit is configured to be combinable with and separable from a vehicle;
the first point is a position of the vehicle; and
the controller further executes performing control to combine the autonomous traveling unit with the vehicle when the autonomous traveling unit reaches the first point.

11. The autonomous traveling unit according to claim 1, wherein the controller further executes controlling the driver to move to a second point different from the first point after the purchased merchandise leaves the driver.

12. The autonomous traveling unit according to claim 11, wherein the second point is specified in the store.

13. An information processing method, wherein at least one computer executes:
acquiring a user ID associated with a user from a user apparatus, the user ID being specific to the user apparatus;
referring to a server apparatus for user information about whether or not the user is a payable user who can use an autonomous traveling unit based on the acquired user ID, the server apparatus storing the user information in association with the user ID, and the autonomous traveling unit comprising a driver including an autonomous traveling ability, the driver being configured to be movable together with a storage configured to store merchandise;
judging whether or not the user associated with the user ID is the payable user based on a result of reference to the server apparatus for the user information;
controlling the driver to wait at a predetermined waiting place in a case where the user associated with the user ID is not the payable user;
controlling the driver to travel with the user apparatus in a case where the user associated with the user ID is the payable user;
acquiring settlement completion information about the merchandise stored in the storage, the merchandise being merchandise in a store; and
controlling the driver to cause the storage to move to a first point outside the store after acquiring the settlement completion information.

14. The information processing method according to claim 13, wherein controlling the driver to cause the storage to move to the first point is executed after the settlement completion information is acquired, and the autonomous traveling unit exits the store.

15. The information processing method according to claim 13, wherein the acquisition of the settlement completion information is executed when the autonomous traveling unit exits the store.

16. The information processing method according to claim 13, wherein the at least one computer further executes acquiring position information about the first point.

17. The information processing method according to claim 13, wherein
the storage is separably provided on the driver; and
the at least one computer further executes separating the storage from the driver at the first point.

18. The information processing method according to claim 13, wherein
the autonomous traveling unit is configured to be combinable with and separable from a vehicle;
the first point is a position of the vehicle; and
the at least one computer further executes combining the autonomous traveling unit with the vehicle when the autonomous traveling unit reaches the first point.

19. The information processing method according to claim 13, wherein the at least one computer further executes controlling the driver to move to a second point different from the first point after the purchased merchandise leaves the driver.

20. A non-transitory storage medium on which a program is stored causing at least one computer to execute:
acquiring a user ID associated with a user from a user apparatus, the user ID being specific to the user apparatus;

referring to a server apparatus for user information about whether or not the user is a payable user who can use an autonomous traveling unit based on the acquired user ID, the server apparatus storing the user information in association with the user ID, and the autonomous traveling unit comprising a driver including an autonomous traveling ability, the driver being configured to be movable together with a storage configured to store merchandise;

judging whether or not the user associated with the user ID is the payable user based on a result of reference to the server apparatus for the user information;

controlling the driver to wait at a predetermined waiting place in a case where the user associated with the user ID is not the payable user;

controlling the driver to travel with the user apparatus in a case where the user associated with the user ID is the payable user;

acquiring settlement completion information about the merchandise stored in the storage, the merchandise being merchandise in a store; and controlling the driver to cause the storage to move to a first point outside the store after acquiring the settlement completion information.

\* \* \* \* \*